United States Patent [19]

Jackson

[11] Patent Number: 4,507,030
[45] Date of Patent: Mar. 26, 1985

[54] CAM OPERATED MACHINING UNIT

[75] Inventor: Richard S. Jackson, Crestwood, Mo.

[73] Assignee: Bourn & Koch Machine Tool Company, Rockford, Ill.

[21] Appl. No.: 402,157

[22] Filed: Jul. 26, 1982

[51] Int. Cl.$^3$ .................. B23C 1/027; B23B 47/18
[52] U.S. Cl. ................................. 409/185; 408/17; 408/129
[58] Field of Search ............ 29/26 A, 26 R, 56.5; 408/129.3, 17, 124; 409/231, 185, 183

[56] References Cited

U.S. PATENT DOCUMENTS

| | | | |
|---|---|---|---|
| 1,735,400 | 11/1929 | Johnson | 408/129 X |
| 2,395,121 | 2/1946 | Hodges et al. | 408/129 X |
| 3,723,016 | 3/1973 | Lehmkuhl | 408/129 |

FOREIGN PATENT DOCUMENTS

| | | | |
|---|---|---|---|
| 965126 | 2/1950 | France | 408/129 |
| 538432 | 8/1941 | United Kingdom | 408/129 |
| 1047640 | 11/1966 | United Kingdom | 408/129 |

*Primary Examiner*—William R. Briggs
*Attorney, Agent, or Firm*—Paul M. Denk

[57] ABSTRACT

A cam operated machining unit for use in providing principally, either, a drilling, reaming, counterboring, trepanning or threading function, upon another component being machined, the unit includes a spindle rotatably supported within a quill, with the spindle having the tool held therein, with the combination of the spindle and quill being disposed for longitudinal shifting, especially in a rapid approach, a constant feed speed, and then a rapid retraction from its position of performing a machining function upon the component being worked; the composite spindle includes a first gear, and which interconnects by a series of intermediate gears with a cam shaft arranged gear, with the cam shaft holding a cylindrical cam which is intermated with conjugate cam followers, that are fixed upon the quill, all being operatively associated with drive means furnishing the rotational movement for turning of the spindle and its tool, with the intermediate gears translating its rotational force to the cam for inducing the longitudinal shifting of the quill and spindle through the agency of the associated conjugate follower.

34 Claims, 13 Drawing Figures

TYPICAL DRILLING SCHEMATIC.

FIG. 11.

TYPICAL TAPPING SCHEMATIC.

CAM OPERATED MACHINING UNIT

BACKGROUND OF THE INVENTION

This invention relates generally to the field of automatic processing of components and parts, and more specifically pertains to a combination drilling and tapping machining unit that is cam actuated for attaining highly precisional and effectively longitudinal shifting of the tool into operative position for performance of a machine tool function, while at the same time, the tool and its spindle are conveniently rotated by the drive means useful for actuating the cam operated machining unit.

A great variety of power operated tools with control feed mechanisms have been available in the prior art, and which incorporate various drives, whether it be the chain drive, or the like, for attaining revolving of the working tool, or the longitunal shifting of the tool during a feed operation. All of these have long been disclosed. For example, the U.S. Pat. No. 2,791,922, to Robinson, discloses a portable power operated tool wherein both rotary motion is provided for its spindle, and translatory motion is also provided for the same through the use of screw thread means that are provided exteriorly of its spindle. While this particular early tool may be effective for accomplishing rather generally the purposes for which it was designed, one of the major drawbacks in the use of such a tool is that backlash cannot be controlled through the type of drive arrangements shown, and therefore, the application of that particular design for installation within precision machine tools, where highly accurate tolerances must be met, cannot be achieved.

A positive feeding structure for both rotating and feeding tools and the like is also shown in the Quackenbush U.S. Pat. No. 3,411,385, but once again, it appears that the feed stroke is obtained through the use of the screw assembly as indicated within its structure. In such a construction, backlash, as when the changeover from one longitudinal movement of the tool to the alternative occurs, as during its application, simply cannot be avoided.

The U.S. Pat. No. 3,512,434, to Juhasz, discloses a drill means with automatic feed and quick retraction assembly, but the structure and operation of the shown device, for attaining both its rotary motion and the automatic feed and retraction movements, are obtained through its drive gear train, and not through the use of any conjugate follower system, and the appended precision that can be obtained from such a system, as is utilized in the current invention.

The U.S. Pat. No. 3,561,544, to Farmer, discloses a parallel shaft driven machine tool way or quill unit, that contains a complex series of interrelated gears for accomplishing both the advanced motions and rotation to the quill type tool driven member. And, the complex interrelationship of its gears and the incorporation of a variety of planetery and sun gears for accomplishing both of these motions, as such, normally induces a loss of precision in machine tool functions because of such an intergeared structure.

The patent Petroff, U.S. Pat. No. 3,690,782, upon a lead-screw tapping head, discloses a threading tool having an axially moveable quill and a rotatable spindle mounted bearing. The advancement of the quill is obtained through a clutch means, attached to a lead screw, in order to obtain this axial movement for the same, but that the use of a lead screw in this type of a structure not only lessens the precision that can be obtained through the operations of the device, as for example, due to backlash that may occur particularly when a precise depth of drilling is sought upon a component being worked, but at the same time, speed of both advancement and the retraction of the tool cannot be obtained from the lead screw type of mechanical means.

The U.S. Pat. No. 3,859,001, to Hoddinott, et al, discloses a quill drive mechanism for machine tools. This particular device incorporates a computer programming means for effecting a slide mounting of the quill supported spindle, in order to obtain axial movement for the latter, while the spindle also undertakes its rotation. This invention is more concerned with the electronic controls for a machine tool, rather than with the construction of the spindle mounted tool itself.

The U.S. Pat. No. 3,885,635, to Mensel, discloses a multi-speed mechanical quill spindle drive mechanism for a machine tool. The spindle of the shown device is rotated by means of the intergearing from the drive motor but that the axial movement for the spindle appears to be obtained from the screw type feed mechanism that mounts upon the surface of the spindle supported quill. Actually, the axial movement for the quill shaft is obtained through a second motor means that produces apparently the rotation for the quill to effect its movement along its threaded connection, as shown.

The patent to Turner, U.S. Pat. No. 3,955,629, discloses a mechanical quill feed unit. But, the unit as shown is one which apparently utilizes the ball-screw assembly for obtaining the rapid axial and feed movements for the quill mechanism, and which is of the type that does evidence backlash problems during its operation.

The additional patent to Turner, U.S. Pat. No. 4,123,187, appears to be very similar to the previously described Turner mechanism, and which also incorporates a lead screw for providing for the axial movement to its quill supported spindle.

Another patent to Petroff, U.S. Pat. No. 4,115,025 discloses a lead screw tapping means, just as in the earlier described Petroff patent, where the tool supported spindle is longitudinally moveable through the same drive motor that affects a turning of the spindle during its operations. It would indicate that some form of a lead screw is carried by the spindle and which is effectively rotated by the drive motor means for obtaining the axial movements for its spindle in additional to its rotational turning during its usage.

The patent to Evans, U.S. Pat. No. 4,201,271, discloses a quill drive with variable feed, wherein a quill is slideable mounted within a longitudinal bore of a support housing, but it is longitudinally positioned by a ball screw. There would not appear to be the incorporation of any cam and follower drive mechanism within this Evans aparatus for obtaining its axial movements for its shown quill.

Some of the very early patents upon cam operated drill units, or other machining units, are shown in the United States patent to Petroff, U.S. Pat. No. 3,704,957, in addition to the U.S. Pat. No. 2,576,291, to Fletcher, upon a machine for cutting glass discs. Likewise, the boring machine described in the Halenbeck, U.S. Pat. No. 1,763,964, discloses automatic machine tooling, while the use of a cam means within a drilling machine is likewise shown in the Frank, et al., U.S. Pat. No.

2,885,914. Another boring machine, for constructing piston rings, is shown in the early Cramer U.S. Pat. No. 1,946,523.

In addition to the foregoing, a boring machine incorporating a cam mechanism for obtaining its drive is shown in the Barnes, et al., U.S. Pat. No. 1,880,666, while additional patents of this category are shown in the machine tool patent to Oberhoffken U.S. Pat. No. 2,167,673. The Schroeder U.S. Pat. No. 2,321,525, discloses an electric hoist, incorporating gearing mechanism, while the early United States patent to Kingsury, U.S. Pat. No. 1,998,873 shows a fluid pressure feeding mechanism for metal working tools. The Corwin U.S. Pat. No. 1,950,597 shows an automatic drilling machine.

Linear actuator apparatus incorporating rack and pinion drives are shown in the Ovshinsky, U.S. Pat. No. 3,381,539, while another form of drilling unit, incorporating various rotational movement means therein, but having links for obtaining its longitudinal movement is shown in the U.S. Pat. No. 2,574,347 to Nelson.

One of the main features of the current invention, and that which is desirably obtained from its structure, is the ability to operate a machining unit with a high degree of precision, where tolerances are kept at a significant minimum, whereas, in the prior type of devices previously analyzed, usually tolerance limitations vary quite significantly, mainly due to the problems associated with the presence of backlash, and related type of inefficiencies that have prevailed in prior designs in relation to the type of unit analyzed herein.

It is, therefore, a principal object of this invention to provide a cam operated machining unit, whereby positive mechanical synchronization of the control cam to the rotation of the spindle is incorporated to satisfy the end result of providing a pre-determined longitudinal displacement of the quill for each revolution of the continuous rotating spindle. This principal objective provides for uniform and consistent chip loading on the cutting tool which enhances cutting tool life and yields exactly mathematically defined machining times for each production utility cycle of the cam actuated unit.

Another principal object of this invention is to provide, as previously explained, a ribbed cylindrical cam for use in conjunction with the preloaded followers that provide a positive stroke control throughout the machining cycle, without any detrimental backlash being encountered.

A further object of this invention is to provide a rather cam actuated drill unit for use in conjunction with station type of machine tool processing.

Another object of this invention is to provide a cam operated machining unit that can be utilized, in combination with a plurality of such units, to achieve high production in the output of the components being manufactured.

A further and significant object of this invention is the use of a computer designed cam that incorporates a motion profile specifically selected for initiating a rapid approach toward the work station, then movement through a constant feed rate through the machining function, immediately followed by an accelerated retraction of the tool from its sites of work.

Still another object of this invention is to provide a cam actuated machining unit that incorporates full overload protection through the intergrating of electro-mechanical systems that cause clutch and brake means to disengage the unit and disable its working tool and components.

Still another object of this invention is to provide a cam operated machining unit wherein its feed means for operation of its cam is provided through a series of interrelated gears that are replaceable to provide a full range of standard operating feed ratios between approximately 42 to 1 to 1,380 to 1; there being approximately 250 different ratios within the range which can be obtained by simply changing easily these accessible quick change feed gears.

Still another object of this invention is to provide a cam operated machining apparatus that can achieve a full range of spindle speeds during unit operation.

Another object of this invention is to provide a cam operated machining unit wherein its individual spindle may be replaced by a multiple spindle tang drive for furnishing more than one machining operations from a plurality of tools all simultaneously.

Yet another object of this invention is to furnish a machining unit that is slide mounted for obtaining its quick adjustment during set up.

These and other objects will become more apparent to the skilled in the art upon reviewing the summary of this invention, and and upon undertaking a study of the description of its preferred embodiment, in view of the drawings.

SUMMARY OF THE INVENTION

This invention contemplates the fabrication of a self-contained, cam operated machine unit. It is one that can be used principally for precision drilling, tapping, reaming, boring, or milling of products and components. This unit is an accessory to a machine tool that is used for producing a specific configuration in a piece part through removal or transformation of material from or in the part or component being worked on. Usually, the material is metal, plastics, or the like, and the operations performed by the unit are, but not limited to, as aforesaid, the drilling, tapping, chamfering, boring, milling, facing, and reaming. The unit is self-contained inasmuch as it is capable of being assembled and furnished to industry in a completed form, with a rotatationary power supply systems to provide rotational and transverse functions to the cutting tool that is positioned within the spindle means of the unit. This cam-operated unit is usually employed in concert with such other units on a machine tool to perform a number of the type of operations as previously explained, even upon the same piece part being worked, all simultaneously or in sequence during a production run of a multitude of such components or parts.

This invention employs a single power source—usually an electric motor—to rotate the cutting tool contained within the spindle member, and also to simultaneously attain rotation of a cylindrical cam, or a related style of cam, wherein through a follower system, mating upon the cam, such as a conjugate cam follower system, the quill in which the spindle is secured traverses and reciprocates forwardly and backwardly in a controlled lineal axial pattern as determined by the profile of the formed cam means. This system of cam and spindle means driven by a single power source along with the mechanical interconnection through gearing of the spindle and cam shaft, provides for precise relation and mechanical interlock of the spindle rotation and its axial movements during usage and operation of this machining unit. This particular relationship is normally expressed in inches of displacement of the cutting tool, per revolution of the spindle, during the invention's operation.

More specifically, the invention provides for the parallel disposition of a pair of shafts, initially a spindle aligned shaft, and a cam shaft, which are supported for rotation within a housing or base means that provides the full support for all of the operating mechanisms of this particular machining unit. A motor means is operatively associated with the housing, and through intergearing with one of the shafts, provides for the rotational movement required for the spindle held tool during machine usage. Likewise, a series of interconnecting gears are arranged intermediate the spindle and cam shafts, and provide also for the rotation of the cam shaft during unit operation. At one end of the cam shaft is mounted the cam means of this invention, which in the preferred embodiment, may comprise a cylindrical cam, and initiation of the rotation of the said cam means can be achieved through the engagement of a clutch that is operatively associated upon the said cam shaft. But, in the alternative, when it is desired to discontinue any rotation of the cam means, a brake means is also operatively associated with the cam shaft, and when actuated, provides for a discontinuance in the rotation of the cylindrical cam means.

The supported spindle of the machining unit is contained for rotation within a quill member, and which quill member is bearing mounted for lineal movements, in opposite directions, within the unit housing, and said quill has mounted thereon, for rotation, a conjugate follower system that roller mounts with respect to the formed rib of the cylindrical cam means, and which provides for the controlled axial movements of the quill and its supported spindle and tool, during operations of this machining unit. The conjugate follower system is preloaded, which provides for the controlled axial movement of the quill in both directions while experiencing no backlash, thus eliminating the necessity of employing springs, or other resilient means, that heretofore had to be utilized in order to sustain the contact of the followers on the cam surface profile, at all times during unit functioning. As is well known, springs are subject to fatigue, and a resultant decrease in inherent resiliency, which thus detracts from the usable thrust capacity of this machining unit, and certainly could minimize precision in unit functioning, such as does occur with prior art style of machining units related to that which is described as this invention.

This invention does employ, as previously explained, an overload device, contained within the drive clutch means, whereby as the quill is thrust forward, and in the event that excessive axial load on the quill because of tool dulling or jamming shall occur, the cluth driving member is formed to separate, and this form of movement is sensed by a limit switch, for immediately curtailing unit operation. This limit switch signal is then utilized to render the unit inoperative, and to provide an overload notice to the machine tool system so that it can be completely shut off, at least until such time as the overload situation is remedied. With this style of overload device, system damage to the unit and machine tool members are minimized, and rendered virtually nonexistent.

Another significant feature of this invention that deserves summarization herein is that interconnecting gear means that couple the functioning of the spindle shaft with the clutch shaft, as previously explained, are predisposed accessibly so that their removal and replacement can be immediately performed, by the technician, so that different ratios and corresponding gear changes can be immediately reinstalled into the unit, as calculated necessary for achieving a rapid approach stroke, for the spindle held tool, a gradual feed stroke during the machining operation, and then an accelerated retraction stroke after completion of the machining operation. In addition, while the feed and retraction strokes are generally governed by the profile of the cylindrical or other cam utilized within the unit structure, the speed and control under which these movements are undertaken can be readily predetermined, and interchanged, or converted to that which is needed, by an immediate replacement of the interconnecting gears arranged between the previously identified shafts.

It must further be explained that both the profile of the cylindrical cam, in addition to the formation and relationship of the various interconnecting gears provided between the cam and spindle shafts, have been predetermined during machine design, and have been computer stored, so that information regarding stroke speed and machine operation can be readily determined upon computer printout. In the preferred design, there are four feed change gears forming that interconnecting gear assembly, arranged inside the unit and behind an easily removable and accessible side cover plate, and which change gears can be arranged in approximately eight hundred forty-one combinations of four feed change gears that may be utilized with this invention. In the preferred embodiment, as previously alluded to, two hundred fifty combinations of these interconnecting gears, with four gears in number forming the gear system, have been selected and filed in a computer for processing and for immediate usage for determination as to that size and combination of gears needed to satisfy a particular working condition for the machining unit during its operations.

An example of the mathematics involved, as for one model fo this invention, in determining cam and gear system usable when the unit is employed in a tapping or threading mode application can be determined as follows. When a unit is used for tapping the universal cam is employed upon the cam shaft. This cam has a constant helix with a lead (inches displacement per revolution) of 5.5 inches. Further, the cam has a segment off dwell at each end of the helix to prevent the cam followers from running of the cam rib. No rapid approach or rapid retraction is utilized in the tapping procedure. During the forward stroke when threads are being cut, while the cam must be stopped and reversed, the cam followers are engaged in the helix portion of the cam. Therefore, the usable maximum stroke of the unit is approximately 3.5 inches. When the unit is in a normal retracted positon the cam followers will be on the previously mentioned rear dwell. When applying the unit to a tapping application the following procedure is followed. The basic goal is to determine the ratio required between the spindle rotation and cam shaft. The unit has a ratio range of 41.666:1 to 1382.399:1. The cam rotates 1/ratio of a revolution for each complete spindle revolution. One revolution of the cam would theoretically displace 5.5 inches as stated previously, and therefore, under the following calculation, the desired ratio to be obtained from the gear combinations can be determined from the following formulation.

$$\frac{1}{\text{ratio}} \text{ (Portion of cam rev. per one spindle rev.)} \times 5.5 \text{ inches (Rate of displ. for one cam rev.)}$$

$$= \text{Desired feed rate (inches/spl. rev)}$$

$$\text{Or } \frac{1}{\text{ratio}} \times 5.5 = \text{Pitch of tap, or } \frac{5.5}{\text{ratio}} = \frac{5.5}{P} = \text{desired ratio}$$

Many ratios are obtainable by changing feed gears, to the numbers as previously explained, and after calculation of the desired ratio, the nearest next lower ratio and corresponding change of gears can be easily selected from a predetermined chart. This will result in an actual greater pitch at the cam and cause a compression tap holder to compress slightly as the hole is tapped. The standard range for drilling can be used for pitches as low as ⅛ (low ratio=41.666:1), when using the universal tapping cam. The standard range is changed by simply changing to the appropriate feed gears listed upon a predetermined chart. Once the ratio is established, the unit cycle time for given application can be closely approximated, and the following data can be used for determining unit cycle operating time that may be achieved from the selected gears.

TPI=Threads per inch of tap
L=Length of tap stroke including clearance
RPM=Spindle Speed $$\frac{TPI \times L \times 2 \text{ (rev. in and out)}}{\text{Units cycle time (sec.)}} = \frac{RPM}{60}$$

$$\text{Or unit cycle time} = \frac{TPI \times L \times 2 \times 60}{RPM}$$

The summary of the invention herein set forth defines, generally, a highly precise operating machining unit that yet inherently possesses, due to its structure, the ability to be converted into a wide range operating unit whose speed and range of operation can be readily changed through a minimum of time and effort.

DESCRIPTION OF THE PREFERRED EMBODIMENT

Figure 1:
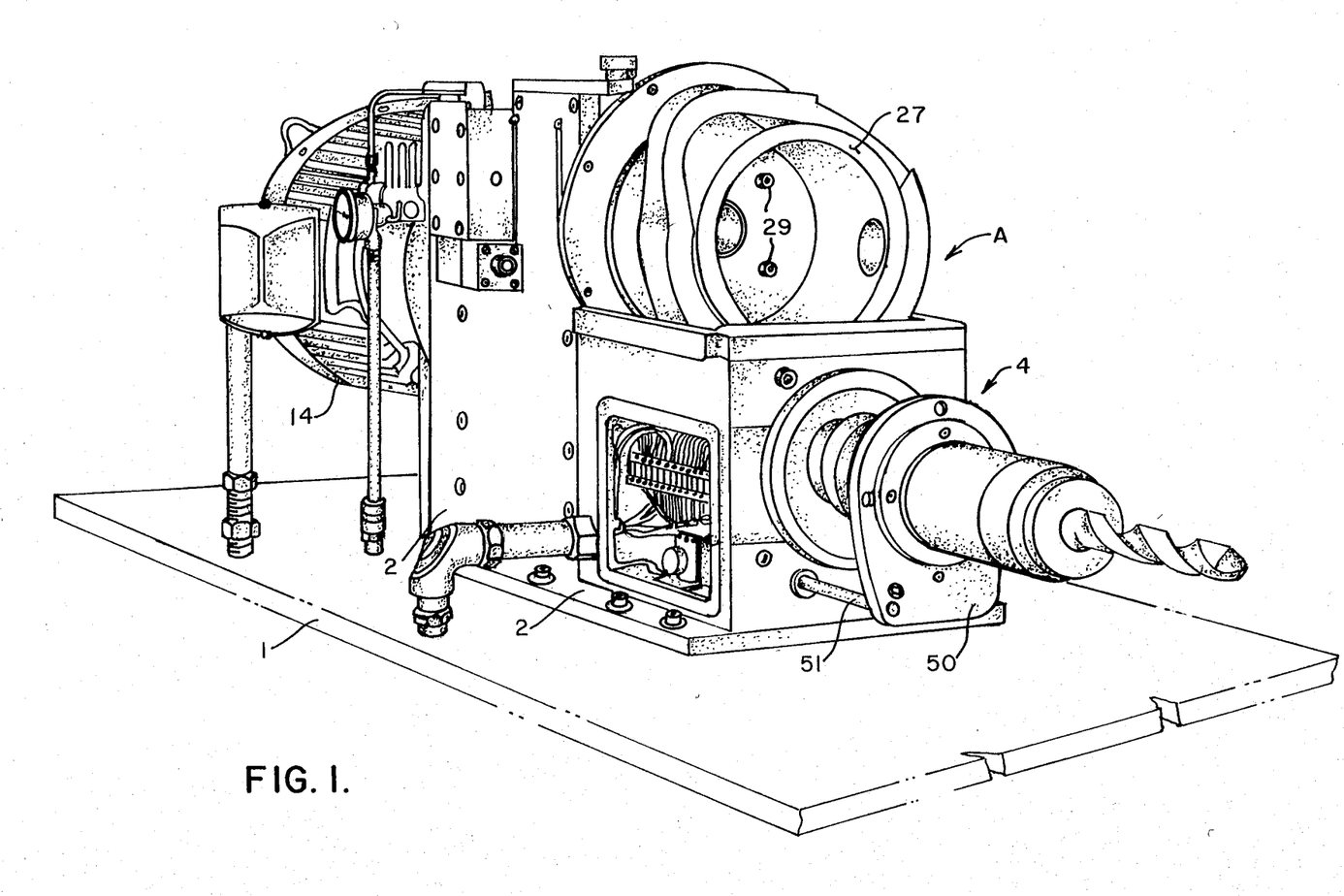
FIG. 1 discloses an isometric view of the cam operated machining unit of this invention.
Figure 2:
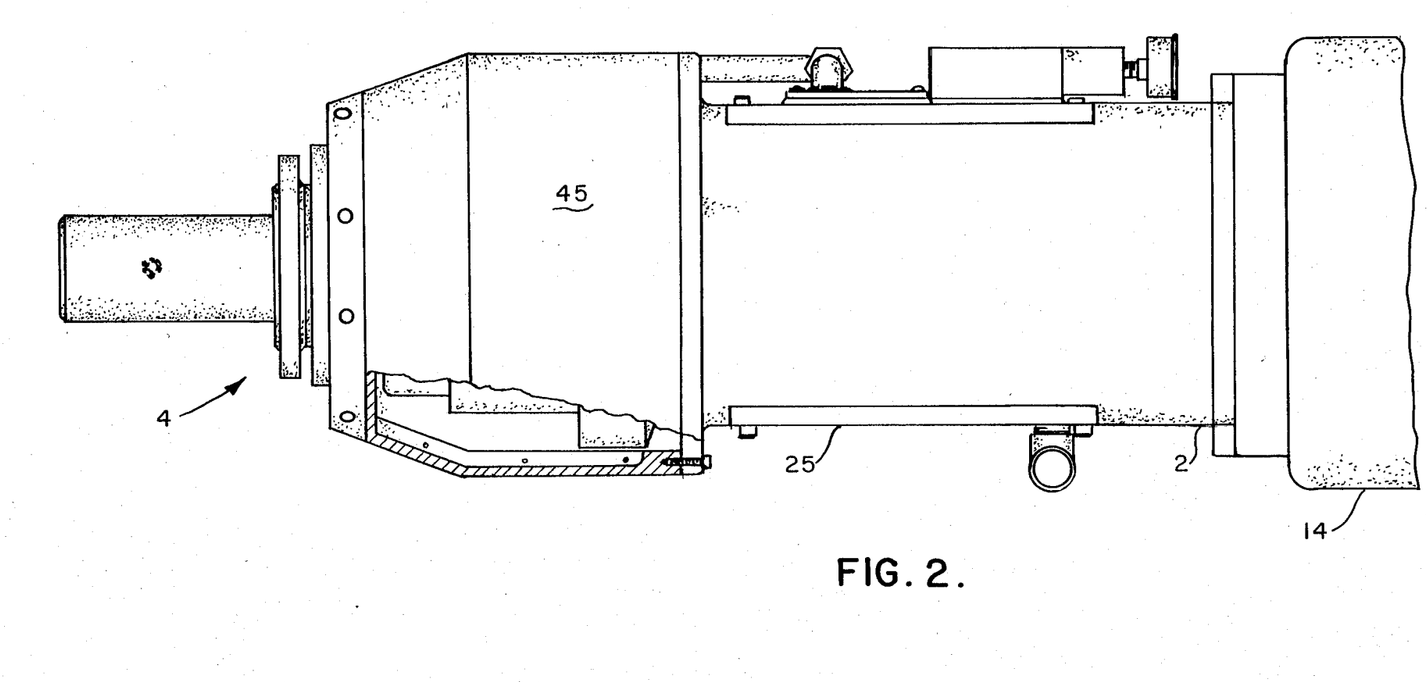
FIG. 2 provides a plan view thereof.
Figure 3:
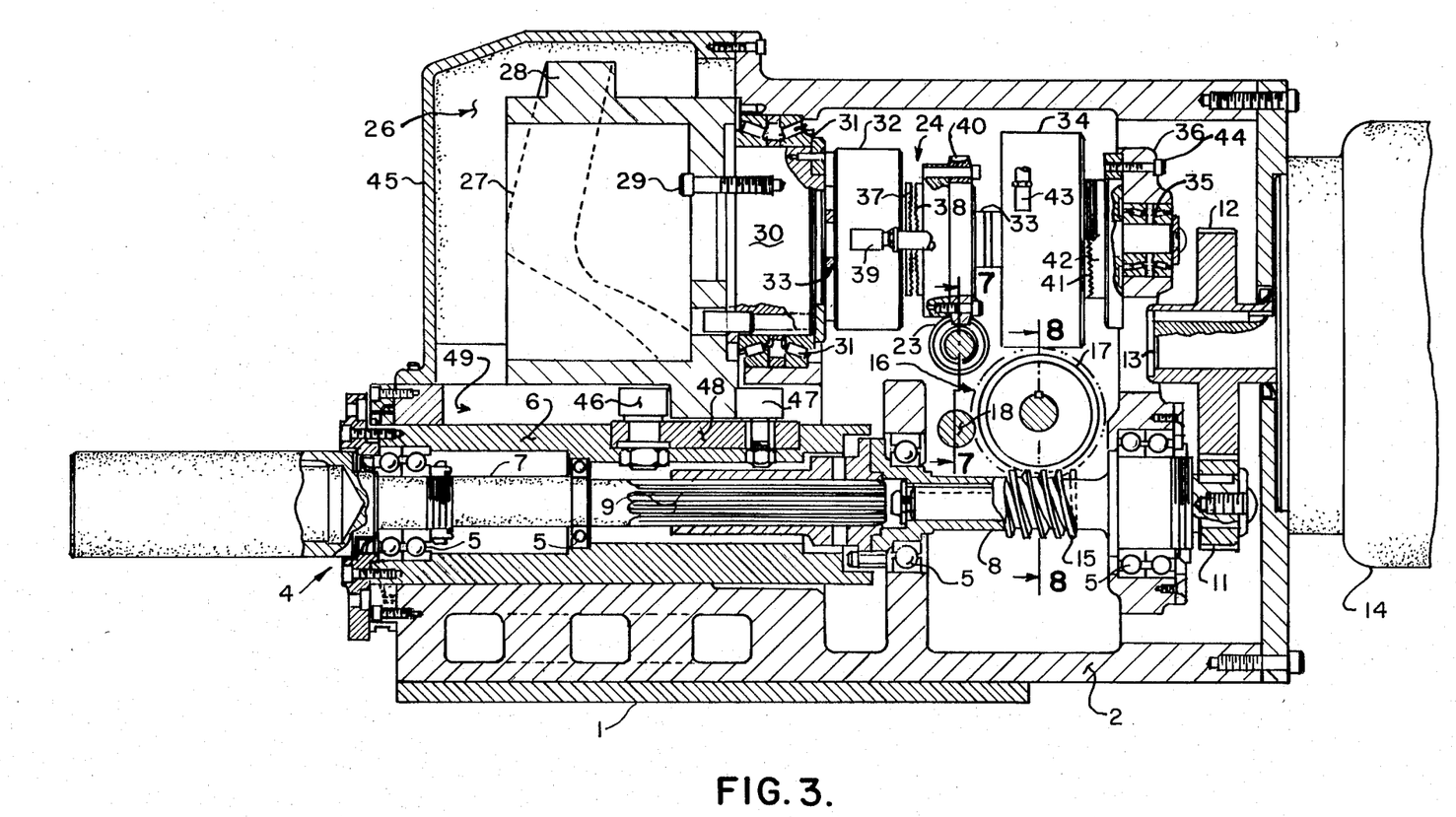
FIG. 3 provides a longitudinal sectional view taken along the line 3—3 of FIG. 5.

Referring to the drawings, and in particular FIGS. 1 through 3, therein is disclosed the Cam Operated Machining Unit A of this invention. The unit includes the various structural supports forming both the means for mounting of the unit upon a machining unit surface, such as at 1, in addition to forming the various other housings or base member 2 that are used for supporting and enclosing the various integral components that make up the construction of this cam operated machining unit. The housing may be slide mounted upon its support for quick adjustment purposes.

Basically, the invention includes a spindle means 4 rotatably supported by means of a series of bearings, as at 5, within both a quill unit 6 and upon the base member 2 as can be seen. The spindle means 4 is actually made up of two components, comprising the forward spindle portion 7, and which is rotatably mounted within the said quill 6, while the rear spindle portion 8 is rotatably mounted, also by means of bearings 5, within the base member of the unit. The forward spindle portion 7 and the rearward spindle portion 8 are shiftably held together, as along its splined connection 9, so that not only do the two spindle portions rotate simultaneously during functioning of the unit, but likewise, relative lineal displacement of the two spindles may occur at the same, particularly when the forward spindle portion is being shifted lineally during advancement in performance of a machine function, and during its retraction therefrom.

Figure 6:
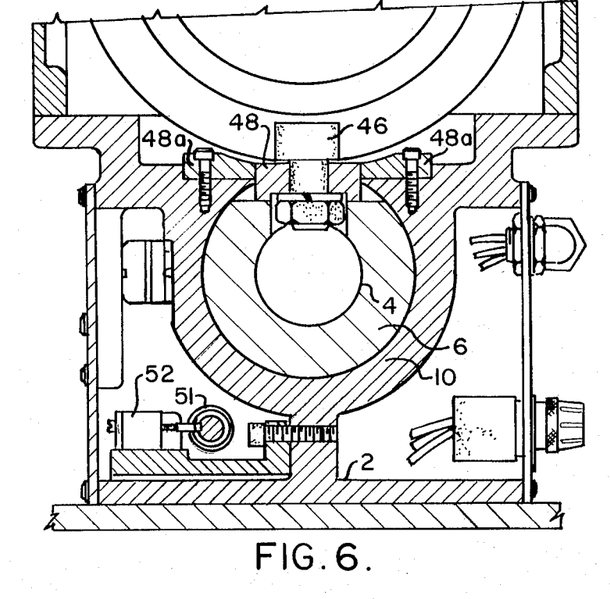
FIG. 6 provides a partial sectional view of the unit, taken along the line 6—6 of FIG. 4, and disclosing the conjugate cam relationship between the quill and cam means of this invention.

Integral support for the spindle means 4, in addition to its quill 6, as formed by the base member 2, can be more accurately seen in FIG. 6, wherein the base member 2 is formed having an integral sleeve like portion 10 that surrounds a significant circumferential portion of the quill and spindle combination, so as to assure that the longitudinal shifting that occurs of these components during unit operation can be attained without any resistance, but at the same time, have sufficient stability during performance of this function so as to minimize the tolerances so that a machining operation is performed to precision dimensions.

The rearward spindle portion 8 extends to approximately the back end of the housing of the base member, and there it has arranged a gear means, such as the helical gear 11 as shown, and which is disposed for intermating with another gear 12 provided upon the end of the drive shaft 13 of the drive means 14, as can be seen. Generally, the drive means includes an electric motor, and in the preferred embodiments, is a standard NEMA frame for C-face mounting. The horse power ranges are usually from 1 to 3, for providing rpms in the vicinity of 900 revolutions per minute; motors in the vicinity of 1 to 5 horse power for producing 1,200 rpms, may be employed; or a motor having a horse power in the range of 1 to 10 for producing 1,800 to 3,600 revolutions per minute has been utilized. It is the usage of the maching unit or its determined function that dictates what size of standard electric motor will be selected for the packaged unit.

Figure 7:
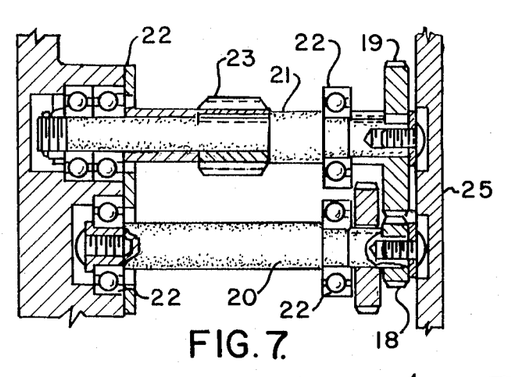
FIG. 7 provides a sectional view of some of the intermediate gears taken along the line 7—7 of FIG. 3.
Figure 8:
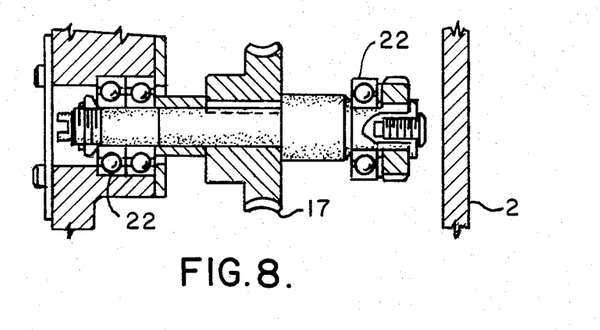
FIG. 8 provides another sectional view of other of the intermediate gears taken along the line 8—8 of FIG. 3.
Figure 9:
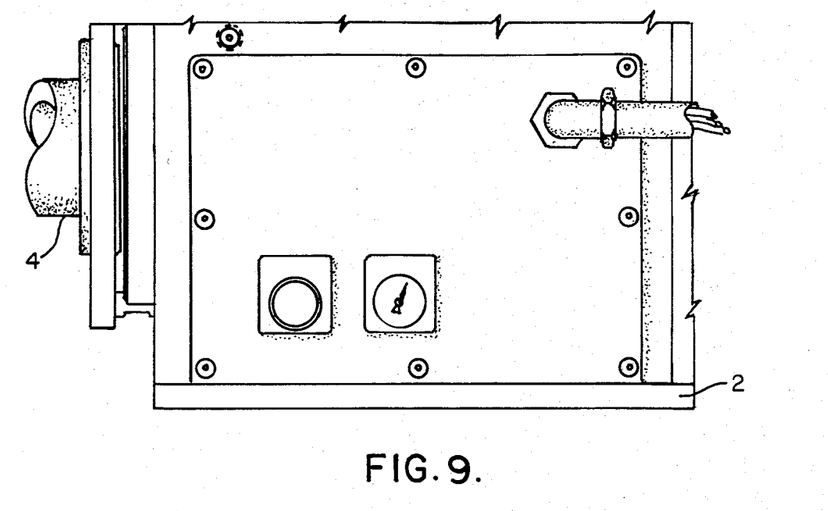
FIG. 9 provides a left side view of the lower section of the machining unit of this invention.

Provided upon the rearward spindle portion 8, is another gear means 15, and which gear means may be intergrally formed thereon, as shown, and is disposed for interconnecting with an intermediate gear means, as shown generally at 16, and which is structured and has utility for the following purposes. The intermediate gear means includes a gear 17 intergeared to the gear means 15, and which gear is directly driven therefrom. In referring also to FIGS. 7 and 8, the additional intermediate gear system is further disclosed. The gear 15 interconnects with a lower intermediate gear 17, which is geared to a gear means 18, and which is likewise connected with an upper intermediate gear 19, with all of these gears being disposed for rotation upon their respective gear shafts, as at 20 and 21, as can be seen. A series of bearings, as at 22, support the various gears and shafts for rotation. Another gear 23 rotates in unison with the turning of the shaft 21, and this particular gear is interconnected with a clutch means 24, which will be subsequently described.

The purpose of the construction of intermediate gear means 16, in the manner as just previously explained, is done so principally to provide and furnish a quick change to these various intermediate gear means, previously explained as being formulated, for determining that relative displacement, both time and distancewise, of the quill and spindle means during unit operation. As can also be seen in FIG. 2, a closure means 25 is provided upon the left side wall of the unit base member and housing 2, and this particular closure means can be promptly removed, which readily exposes the intermediate gear system 16, as just explained for accomodating quick changes therein. When this is performed, the variety of intermediate gears can be readily removed, and replaced with another gear system, so as to provide for regulated and precise setting of the unit in its operation, and particularly timed advancement and retraction of the quill and spindle means during performance of a machining function. In fact, as previously explained, the preferred embondiment for this machining unit has been developed through computer design to provide for the replacement of various intermediate gears within the gear system 16, and that a total of approximately 841 combinations of four feed change gears can be utilized for controlling all useable movements. In actual practice, of the aforesaid combinations, approximately 250 combinations have been selected and filed in computer storage for use for processing and cam unit purposes, and at speeds and timing periods for operations of the unit can function within available ratio ranges from 41.666:1 to 1382.399:1. Thus, the principle of this machining unit can be designed specifically for precision functioning within time increments, and to quill displacement that are highly precise to fit the specifications of the particular customer's needs.

The lineal motions that furnishes both advancement of the machine tool towards and during a machining function, and additionally retracts said tool after completion of a machine function, is generally regulated by the cam means 26, as located in the upper portion of the machining unit. Obviously, the precise location of this cam means is not essential, since it could be located below the spindle means, or laterally of the same, and still function effectively for providing precision lineal displacement for the tool during functioning. But, parallel arrangement of the spindle and cam shafts is desired. In any event, the cam means 26 includes a cam 27, which is previously explained is preferably a cylindrical cam, as shown, having its integral rib 28 precisionally machined within parameters for obtaining the type of shifting desired for the specified machine tool. In any event, the cylinder cam has been found most practical for this particular application, although other styles of cams fitting the configuration and the parameters for operation of this machine tool may be substituted therefore. The cam means 27 is secured, such as by the fasteners 29, to a bearinged support 30, being stably disposed for rotation within the base member, or more specifically its formed housing, by means of the bearings 31. The bearing supported member 30 connects with the clutch means 24, which in this particular instance, comprises a single or multipositional toothtype clutch, and of the type that may be obtained from Horton Manufacturing Co., Inc. of Minneapolis, Minn. This type of clutch is generally air pressure actuated, and in this particular instance, is a normally opened clutch while the machining unit is not operative, but that when the clutches engages, then the intermediate gear means transmits rotational force through the clutch to the cam means 27. The clutch means 24 incorporates clutch part 32 and is secured to the support member 30 by means of a shaft 33, with that said shaft extending through the entire clutch means, and a brake means 34, and also being bearing mounted, as at 35, to a part 36 of the housing of the base member 2. The first clutch part 32 is fixed to the shaft 33, its support member 30, and therefore, is normally static except under those conditions when the clutch means 24 is engaged, as when the serrated clutch plate 37 is actuated into engagement with the serrated clutch plate 38, due to the admission of air under pressure by way of the air flow line 39. When such engagement is made, the clutch gear 40, being turned by the intermediate gears 16, and more specifically by its gear 23 with which it engages, will initiate an instantaneous rotation of the clutch means, and its shaft 33 and supporting member 30, for effecting a rotation of the cam means 26. During this instance, the brake means 34, along with its serrated brake plates 41 and 42, will become disengaged due to the introduction of air pressure by way of the flow line 43 so as to cease it braking function normally preventing rotation of the cam means 26. It might be commented that this brake means can be obtained also from said Horton manufacturing Co., Inc. To the contrary, when a machining cycle has been completed, or when operations of the machine are being curtailed, the pressurized air is likewise shut off, does not flow through the flow lines 39 and 43, and in this instance, resilience spring means contained both within the clutch and the brake cause the clutch to become disengaged, while simultaneously engaging the serrated brake plates 41 and 42 of the brake so as to prevent further rotation of the cam means 26. It is to be noted that the serrated brake plate 42 is rigidly fixed, by means of the fasteners, one as shown at 44, also to the housing 36 of the base member 2, so as to provide for fixed braking to retard rotation of the shaft 33, and its connected cam means 26.

It is also to be noted, as in FIG. 1, that the cylindrical cam member 27 is secured by means of the series of fasteners 29 to the support member 30, and that upon quick removal of these fasteners, the cam member can be removed, and readily replaced by another cam member that is selected for the next machine tool function of the machining unit. Access to the cam member 27, and the cam means 26, in general, can be attained through a simple removal of the upper hood 45, as can be seen in FIG. 3.

The longitudinal stroke to be attained for the quill and its supported forward spindle portion is achieved through an interconnection of the conjugate followers 46 and 47 that are preloaded in their contact upon opposite sides of the formed cam rib 28. Since these followers are preloaded in their disposition, biasing against the lateral surfaces of the cam rib, no looseness or play is encountered during cam means operation, and therefore, the elimination of such backlash assures preciseness in the performance of the machining operation to a predetermined fine degree of tolerance, if any. These conjugate followers are secured to the follower retainer mounting means 48 and additionally secured to the quill 6, which in this particular instance, comprises the cylindrical like member formed for lineal movement, reciprocatingly, within the sleevelike support 10 of the unit as previously explained. The positioning blocks 48a keep the conjugate followers system conveniently positioned. Thus, the quill in addition to the forward spindle portion 7 are free for some degree of lineal movement within the base member, and in the preferred embodiment, a reciprocating stroke in the vicinity of approximatly four inches, may be acquired during machine operation. Obviously other stroke dimensions may be designed into the unit. As shown in FIG. 3, the unit is in its fully retracted state, an adequate clearance, as at 49, is provided for unobstructed movement of the followers under the influence of the turning of the cam member 27, to provide for a full reciprocating stroke for the spindle during performance of a cycle. It might further be commented that adequate clearances is provided between the quill 6, and spindle portion 7, in order that adequate lubrication may be provided therein so as to furnish near frictionless operation and reciprocal movement of these various parts relative to each other during repeat cycles of the apparatus. It is to be noted that such lubrication is necessary particularly due to the longitudinal movements of the splined portion 9 of the forward spindle part 7 with respect to the rearward spindle portion 8, all of these movements simultaneously occurring while they also are being revolved during machine operation.

Figure 4:
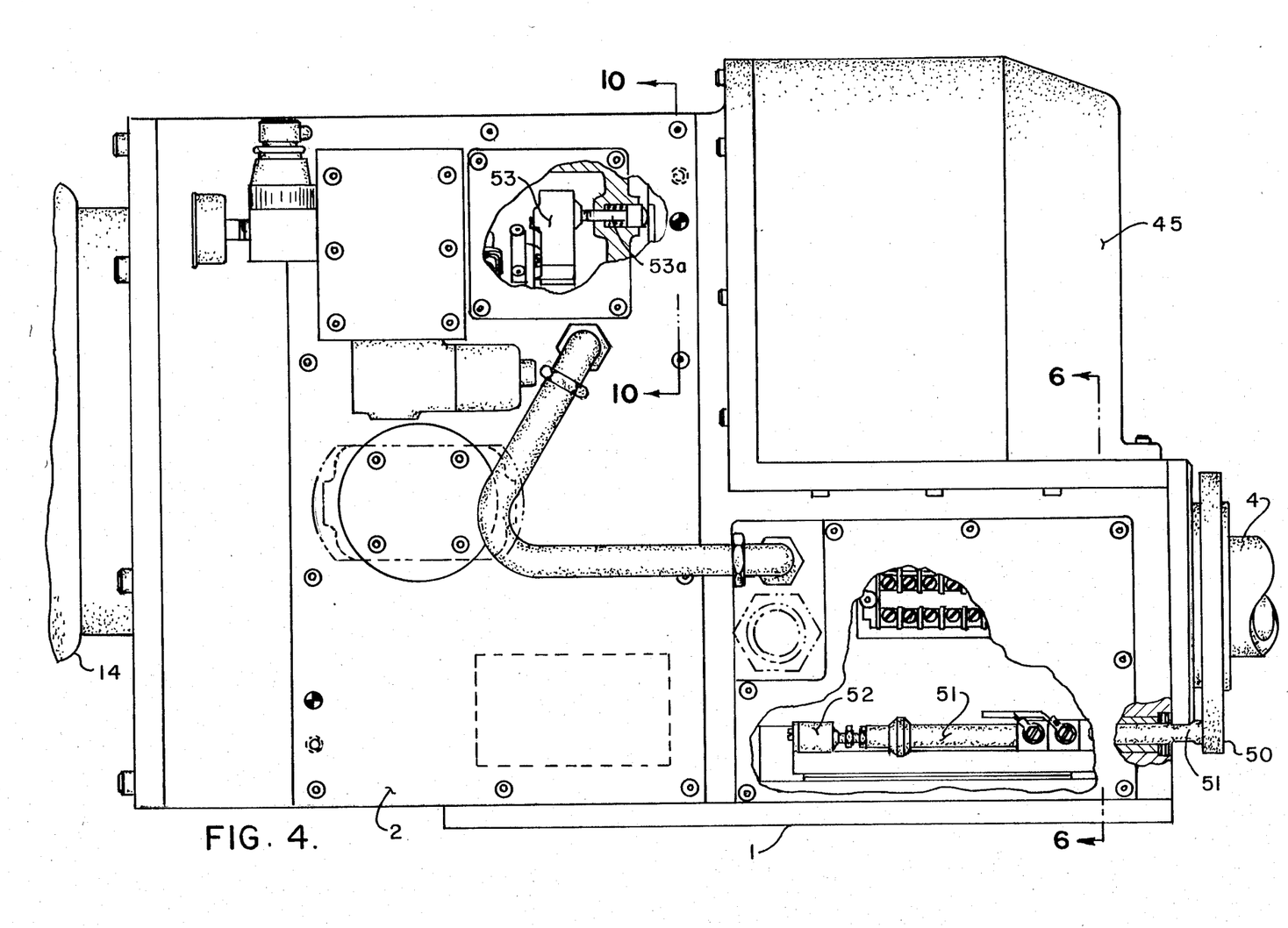
FIG. 4 provides a right side view of the machining unit, with parts being broken away to disclose the operative disposition of the limit switches of the invention.
Figure 5:
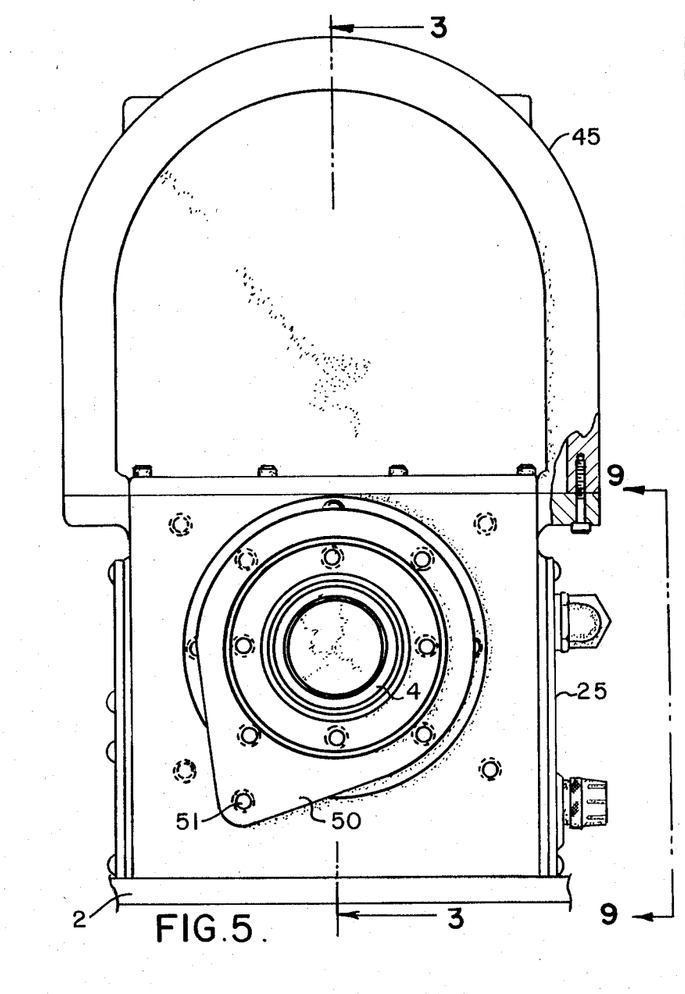
FIG. 5 provides a front view of the invention.
Figure 10:
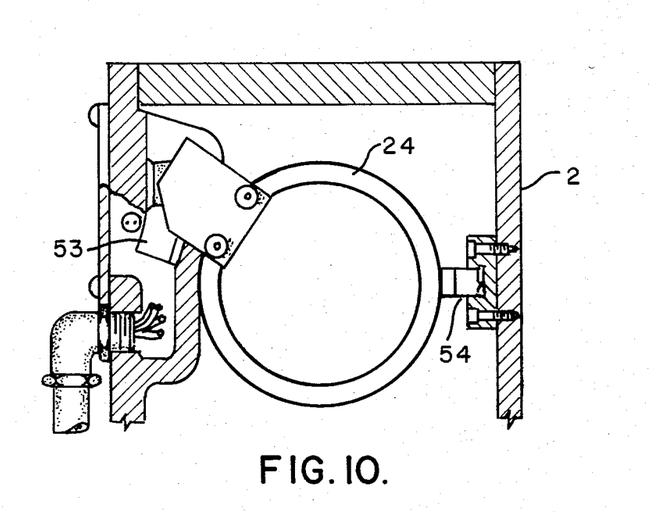
FIG. 10 provides a view of the clutch regulating limit switch taken along the line 10—10 of FIG. 4.

Various controls are provided for starting and stopping the stroke of the quill and spindle part during a machine cycle, so preciseness can be attained in the depth of, for example, a bore hole to be drilled within a work piece, or in the alternative, the depth of tapping to be attained within or upon the same during that instance when the machining unit is utilized for tapping purposes. As can be seen in FIGS. 1 and 5, the forward extension of the quill 6 has a collar 50 secured thereon, and disposed for lineal reciprocating movement simultaneously therewith during each unit cycle. Connecting at the lower portion of the said collar is a control rod 51, and which rod extends inwardly of housing of the base member 2, as can be seen also in FIG. 4, and therein is disposed for encountering a micro switch 52, for discontinuing a cycle of operation when the machining unit attains its fully retracted condition. The depth of penetration of the tool element when using the tapping alternative may likewise be controlled by the arrangement of further micro switch means that are in adjustment with respect to the movement of the control rod 51, but more essentially, the computer designed cam means 26, and more specifically its ribbed cylindrical cam 27, is what regulates the forward movement or stroke of the quill and spindle unit during a machining cycle. Additionally, another micro switch means 53 is arranged for being contacted by the clutch means 24, so that in the event that excessive torque is encountered as when a jamming of the machine tool occurs, during a machine operation, the clutch can sense such excessive torque and contact the micro switch 53 for shutting off the operations of the entire unit, before any instant deterioration or damage may occur to the machining apparatus. The arrangement of this limit switch 53 with respect to the clutch means 24 can further be more accurately seen in FIG. 10. Also shown in this figure is the guide block 54 that maintains the proper positioning of the clutch means 24 during its shifting between engagement and disengagement of the cam means 26 during a machining cycle.

Figure 11:
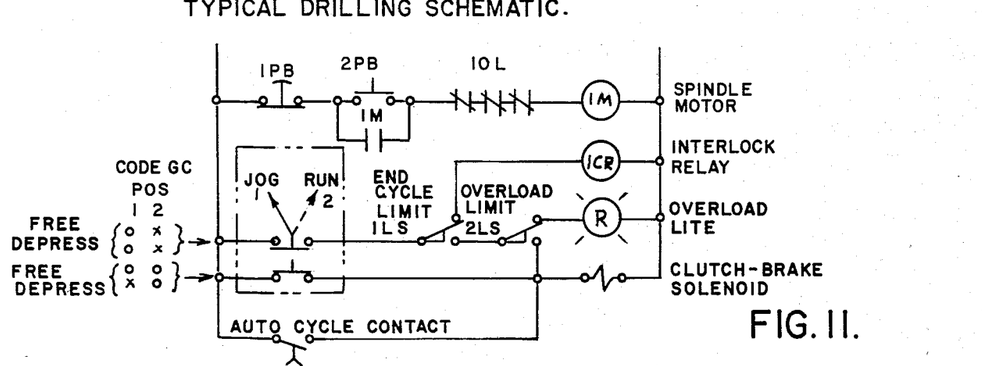
FIG. 11 provides an electrical schematic of the circuitry of the unit when applied during a drilling function.
Figure 12:
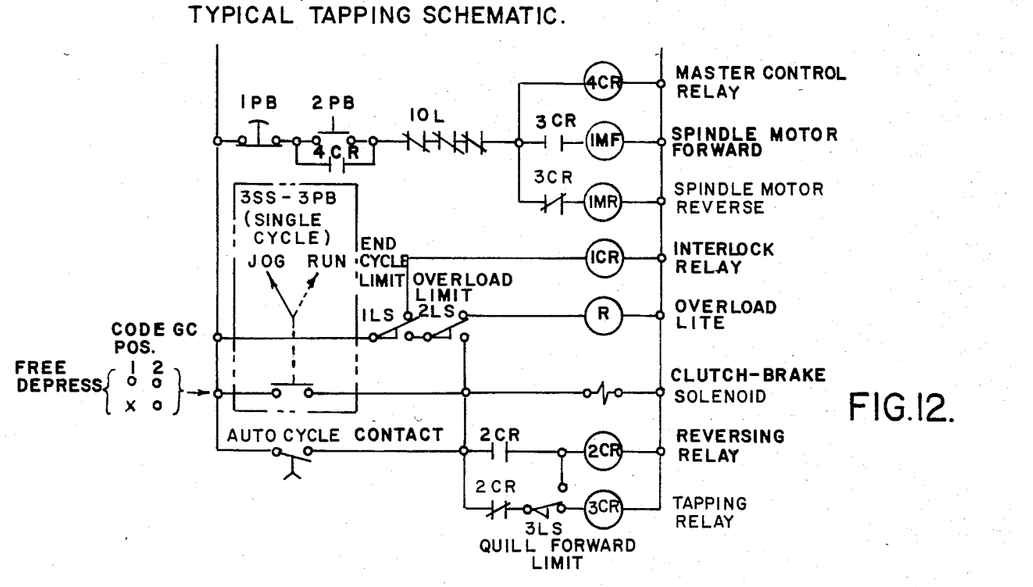
FIG. 12 discloses an electrical schematic of the electrical circuitry for the unit when applied during a tapping function.

The various electrical controls employed for controlling the energization of the motor, and the various operations of the spindle and quill through the agency of the advancement and retracting motions for these said components are shown in FIG. 11 and FIG. 12. The unit features built-in control switches to expedite installation and reduce customer electrical control costs. A typical wiring schematic and explanation of the electrical components provided therein, are as follows. The unit when set up for drilling, can be manually jogged with the various push button selector switches provided in the unit, when set up for tapping, can be single cycled with the push button selector switch also provided. During the drilling and tapping functions, the spindle motor is energized through closure of said pushbutton switches, and the jogging of the drilling tool can be attained through temporary contacting of the jog switch, as can be seen. When a drilling operation is proceeding, the end cycle limit switch 1 LS is held open when the quill is in its retracted position, but normally the open circuit of the switch serves as an interlock when the quill is in its retracted position. The two LS overload limit switches close the circuit to control the solenoid when the clutch is engaged, and opens if the unit is overloaded during a machining tool cycle, and renders the unit inoperative. The LS quill forward limit switch is normally closed, opens when the quill reaches the desired depth of penetration during a tapping operation, in order to cease further penetration of the tapping tool. The control solenoid, generally identified as the clutch-brake solenoid, when energized, provides compressed air to the clutch and brake to achieve a cycling of the unit. The overload light, as identified, provides a signal when the unit is overloaded during the cycle so that corrective measures may be taken. The 3 PB-3SS clutch combination pushbutton selector switch is effective for jogging of the machine, either during drilling or tapping functions, as previously explained. The 1 CR is an interlock relay, operates with the limit switches, and the 2, 3, and 4 CR means or control relays are for use during the tapping mode. The auto cycle contact is to initiate the automatic cycle, upon its closure. The 1MF and 1MR coils are the reversing starter for the spindle motor during tapping applications only. When in the tapping mode, the spindle motor idles in reverse direction when the unit is in its retracted position awaiting for the next cycle to be initiated. The spindle motor runs unidirectional continuously for a drilling application and is controlled by 1M starter.

Figure 13:
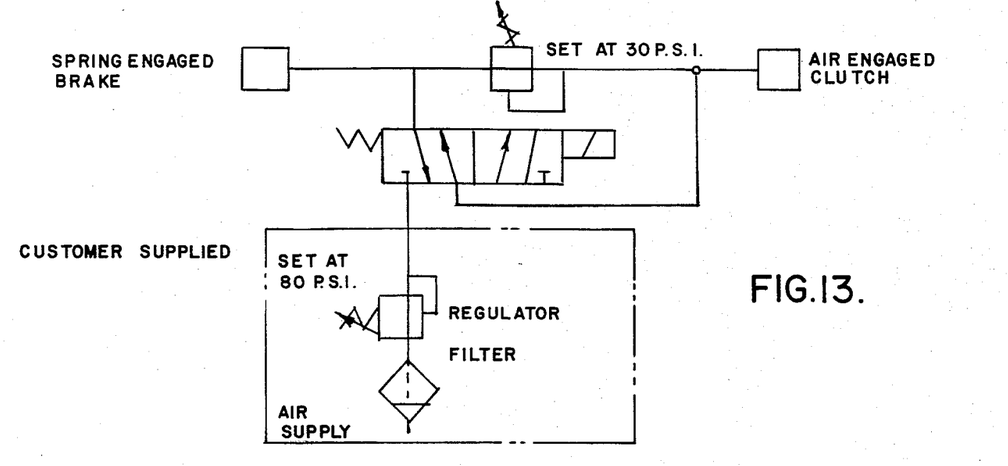
FIG. 13 discloses the pneumatic control circuit for this invention.

As disclosed in FIG. 13, the mechanism for regulating the introduction of air to either the brake or clutch is shown. It comprises a regulator filter that functions in cooperation with a source or supply of pressurized air, and which is connected by way of its flow line through a multi way valve for supplying air, during select moments, to either the normally closed spring biased brake, in order to open it, as during the initiation of a machine tool cycle, or to the clutch means, as when the machine tool is engaged for performance of a machining cycle.

In operations of this cam operated machining unit, the power unit is a completely self-contained machining unit with a continuous running spindle and having the ability to cycle on demand to affect a forward movement of its quill with the rotating and cutting tool in the quill thereby rapidly approaching the work and then entering into a controlled feed motion for a specific displacement as dictated by the control cam means 26. The control cam is directly geared to the spindle rotation so that for every rotation of the spindle a positive displacement of the quill is realized as the rotating cam imparts linear motion to it, and its held spindle, through the pre-loaded conjugate follower system, as identified as the followers 46 and 47.

Electrical motor 14 runs continuously and rotates the spindle means 4, at suitable revolutions per minute, for an application by an appropriate ratio developed by the spindle intermediate gears 16, as previously explained. As shown in FIG. 3, the quill 6 is in its normal back or retracted position ready to cycle and accomplish the intended work on the piece part (not shown). The spindle drive portion 8 rotates the spindle 7 by way of its splined connection 9. The gear or worm 15 on the spindle back portion drive shaft continuously drives the gear 17. A feed change gears and shaft combinations as identified at 18 meshes with the additional intermediate change gears 19 mounted on its intermediate shaft 21, and another intermediate gear 23 mounted on the same shaft meshes with the final clutch gear 40, as previously identified. Hence, there are a variety of intermediate gears, four in number, that comprise the change gears inside of the unit behind the left hand side cover plate 25, as previously explained. The clutch worm gear 40 being intergeared with the intermediate gears as previously explained, is continuously rotated, but the brake means 34 is normally spring biased into closure so as to prevent the rotation of the cam shaft 33. In its normal back or retracted position and with the spindle idling, the air operated brake is spring-engaged into normal closure to prevent rotation of said shaft. The air operated clutch 32 is disengaged thereby allowing its worm gear 40 to continously rotate but not impart motion to the said cam shaft. When the cycle signal is given, a solenoid valve is energized, thereby pressurizing the air brake which disengages the serrated teeth upon the brake plates 41 and 42, thereby allowing the cam shaft to rotate. Simultaneously with this function, the energized solenoid valve pressurizes the air clutch which engages the teeth on the clutch plates 37 and 38, and completes the drive to the cam shaft 33 through the said clutch worm gear 40. The cylindrical cam 27, which is secured to the cam shaft, therefore starts to rotate and continues to rotate for one complete revolution and then is stopped by means of the functioning of the control rod 51 that depresses the control limit switch 52, when the quill has returned to its normal back position. This control switch rod 51 is attached to and axially moves with the quill. The limit switch provides a cycle stop procedure to the previously mentioned air clutch 24, and the brake, deenergizing the solenoid valve. The air clutch is disengaged, and the brake becomes reengaged, by means of its spring biasing, after the quill completes its forward and return movements.

During the cycle, the rotating cam means 27 has a profile which typically provides a displacement of rapid approach, a displacement of constant feed, and then a displacement of rapid retract. And infinitely variable combination of rapid approach feed and rapid retract are available and based upon applicational requirements. The rpm of the cam actually determines the unit cycle time. For example, if the cam is to rotate at 30 rpm, as a result of the spindle rpm and the intermediate gear ratio employed, then the cam would make one revolution in two seconds and that would be the cycle time. That two second cycle time could have any combination of rapid approach feed and rapid retract. Also, the cam 27 has a maximum displacement capability of approximately 4 inches, but any displacement less than that is also possible, depending upon the application. Obviously, the machining unit could be built to other dimensions so as to allow for even a greater or lesser displacement than that specified. The conjugate follower system comprising the combination of the followers 46 and 47 riding upon the cam rib 28 is employed to transform the rotary motion of the cam rib to linear movement of the quill. The two followers are positioned within the mounting block, as previously explained, and in which the quill is arranged for preventing their rotary motion. The rear follower 47 has an eccentric mounting arrangement to affect a preloaded condition on the rib of the cylindrical cam. Displacement is therefore positive in both directions. Depending upon the application, the cam rpm can usually range from 1 to 30 rpms or a sixty second cycle to a two second cycle with most applications normally being preferred somewhere in the area of four seconds to ten seconds per cycle time.

Another feature of this machining unit is that the driving clutch 24 is of the tooth type clutch arrangement and is capable of being overloaded if a jammed condition occurs. There is a detectable movement of the outer member of the tooth clutch 32, and this movement mechanically releases the limit switch 53, as previously explained, through its overload plunger, as at 53a, which is secured to the said outer member of the air clutch. This overload protection system prevents internal damage in the event of external jams while the unit is cycling.

The unit is generally disclosed as containing a single spindle arrangement coupled with the spindle back portion or spindle drive. It is also likely that multiple spindle heads may be employed. For exmple, the spindle means disclosed at 4, in FIG. 1, is a single spindle single tool installation. But, the collar means 50 disclosed in FIG. 5 is of the type that may be employed for securing multiple spindle heads, and a tang drive spindle could be applied and utilized for furnishing a multiplicity of additional spindle head rotations that are mounted upon the said collar 50. These multiple spindle head components are available in the art, and can be obtained from U.S. Drill Head, Inc. of Cincinnati, Ohio.

Variations or modifications to the cam operated machining unit of this invention may occur to those skilled in the art upon reviewing the description of this invention. Such variations or modifications, if within the spirit of this invention, are intended to be encompassed within and covered by the scope of any claims to patent protection issuing on this invention. The description of the preferred embodiment set forth herein has done so for illustrative purposes only.

Having thus described the invention, what is claimed and desired to be secured by Letters Patent is:

1. A cam operated machining unit for use in the automated processing of other components, comprising, a base member, a spindle means capable of holding a tool movably supported upon said base member, said spindle means disposed for rotation, a motor means operatively associated with said unit and functioning to rotate said spindle means during its operation, quill means shiftable lineally and mounted to said base member and having the spindle means supported therein for rotation, said quill means arranged for lineal movement during unit operation, gear means formed upon said spindle means, cam means operatively associated with said quill means, intermediate gear means provided upon said base member and interconnecting the first named gear means to the cam means, for effecting the controlled actuation of said cam means, said cam means comprising a cam and mating follower combination, said cam means actuated into rotation through the operation of the intermediate and spindle gear means, said follower operatively mounted upon the quill means, whereby upon actuation of the said cam means the quill means shifts lineally under cam regulated conditions towards and away from the component being processed, said cam comprising a cylinder cam and having a predetermined rib means formed upon its periphery for precisely controlling the rapid approach and retraction in addition to the deliberate feed of the quill means and its supported spindle means and tool during performance of a machine operation, said spindle means comprising a pair of shafts, said shafts being axially aligned, the first said shaft having a tool holding means provided at its one end, said first shaft at approximately its other end being retained to the second shaft at one of its ends, and said second shaft at its other end being operatively associated with the motor means, and said gear means being formed upon the said second shaft of the spindle means.

2. The invention of claim 1 and wherein said machining unit comprises a drilling unit.

3. The invention of claim 1 and wherein said unit comprises a tapping unit.

4. The invention of claim 1 and wherein said unit being capable of functioning as a drilling and tapping unit.

5. The invention of claim 1 and wherein said cam means comprises a cylinder cam.

6. The invention of claim 1 and wherein said follower of the cam means comprises a conjugate follower combination embracing the cam rib means during unit functioning.

7. The invention of claim 6 and wherein said conjugate follower is preloaded with respect to the cam rib means.

8. The invention of claim 7 and including mounting means supporting said conjugate follower combination, said mounting means securing upon the quill means, and a key way formed upon the housing for accommodating said mounting means therein and preventing the rotation of the quill means during unit operation.

9. The invention of claim 8 and wherein said quill means being formed of a cylindrical member, and the spindle means being bearing mounted for rotation within the cylindrical member forming the quill means, and the mounting means securing onto the said cylindrical member.

10. The invention of claim 1 and wherein said cylinder cam being replaceable by another cam for providing variation in the parameters of the unit operation.

11. The invention of claim 1 and wherein said first shaft being bearing mounted for rotation within the quill means, and the retained second shaft being bearing mounted for rotation within the said base member.

12. The invention of claim 11 and wherein the retention between the one end of the first shaft and the proximate end of the second shaft providing for a relative displacement between the two said axially aligned shafts during unit operation.

13. The invention of claim 12 and wherein the said end of the one shaft being formed as a sleeve and having the proximate end of the other shaft slidably retained therein.

14. The invention of claim 13 and wherein the said two proximate ends of the axially aligned shafts being splined together.

15. The invention of claim 14 and wherein the splined retention of the two said spindle shafts is flexibly made, and wherein during relative lineal movements of the said quill means during cam means functioning the two said shafts are axially displaced relative to each other.

16. The invention of claim 1 and wherein the tool holding means provided at the one end of the first said shaft comprises a chuck.

17. The invention of claim 1 and including a multi-spindle drive securing with the forward end of the quill means and including means operatively associated with the said rotating spindle means to allow rotation of the plurality of spindles provided with the multi-spindle drive.

18. The invention of claim 1 and including additional gear means connecting with the motor means, further gear means connecting proximate with the back end of the spindle means and being intergeared together to translate rotational movement from the said motor means to the spindle means.

19. The invention of claim 1 and wherein the intermediate gear means includes a combination of gears to provide for controlled rotation of the cam means during unit operation.

20. The invention of claim 19 and wherein select gears of said combination of intermediate gear means are interchangeable to provide selection in the precise speed of revolution of the cam means during unit operation.

21. The inventon of claim 20 and wherein said combination of gears includes a series of interconnecting worm gears.

22. The invention of claim 21 and wherein said base member supports said combination of gears in rotation during unit operation, and said combination of gears being accessible through the base member for attaining replacement of select gears of the said combination of gears for changing the speed of revolution of said cam means and the degree of lineal displacement of the quill means during functioning of the said unit.

23. The invention of claim 20 and including a shaft supporting said cam means for rotation, a gear connecting upon said shaft, said combination of gears interconnecting between said spindle gear means and the cam means gear for effecting controlled rotation of said cam means and movement of the said quill and spindle means during unit operation.

24. The invention of claim 23 and wherein said cam means shaft and the quill and spindle means are parallel arranged.

25. The invention of claim 23 and wherein said combination of gears includes a series of interconnecting worm gears.

26. The invention of claim 25 and wherein select worm gears are replaceable within the intermediate gear means to change the speed of revolution of said cam means during unit functioning.

27. The invention of claim 26 and including a series of parallel shafts included in said combination of gears, and therebeing at least one of the worm gears mounted upon each of the parallel shafts to transfer rotational movement from the motor means to the said cam means during unit operation.

28. The invention of claim 20 and including a cam shaft mounting said cam means for rotation, clutch means provided upon the said cam shaft and when engaged providing for rotation of the said cam means through the said gear means, a brake means operatively associated with the said cam shaft and when engaged after disconnection the said clutch means preventing rotation of the said cam means.

29. The invention of claim 28 and wherein said brake means is spring actuated into engagement for preventing the rotation of the said cam means when the cam means is deactuated.

30. The invention of claim 29 and wherein said cam shaft being bearing mounted upon the said base member and providing support for the said cam means, the clutch and brake means of the machining unit.

31. The invention of claim 28 and including a limit switch means provided upon the said unit so that when a jam or overload condition occurs the limit switch provides for disengagement of the said clutch means to prevent internal damage to the mechanisms contained in the unit.

32. The invention of claim 1 and including a limit switch means provided upon the said unit and when actuated providing for deenergization of the said motor means.

33. The invention of claim 28 and including said limit switch means being responsive to the lineal movements of the quill means for determining when the limit of unit operation has been attained for curtailing its operations.

34. The invention of claim 10 and wherein said another cam being one of a face cam, barrel cam, end cam, plate cam, and flat cam means.

* * * * *